United States Patent
Nakai et al.

(10) Patent No.: US 9,214,894 B2
(45) Date of Patent: Dec. 15, 2015

(54) EVALUATION METHOD FOR SOLAR POWER GENERATION SYSTEM, EVALUATION DEVICE, AND EVALUATION PROGRAM

(75) Inventors: Takuya Nakai, Kyoto (JP); Takanori Ishii, Uji (JP); Akira Enami, Ashiya (JP); Akihiro Funamoto, Seika-cho (JP); Kazuhiko Kato, Tsukuba (JP)

(73) Assignees: OMRON CORPORATION, Kyoto (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 740 days.

(21) Appl. No.: 13/519,613

(22) PCT Filed: Jan. 17, 2011

(86) PCT No.: PCT/JP2011/050656
§ 371 (c)(1),
(2), (4) Date: Jun. 28, 2012

(87) PCT Pub. No.: WO2011/089999
PCT Pub. Date: Jul. 28, 2011

(65) Prior Publication Data
US 2012/0303298 A1    Nov. 29, 2012

(30) Foreign Application Priority Data
Jan. 19, 2010 (JP) ................................. 2010-009430

(51) Int. Cl.
*H02S 50/10* (2014.01)
*G05F 1/67* (2006.01)

(52) U.S. Cl.
CPC ...................................... *H02S 50/10* (2014.12)

(58) Field of Classification Search
CPC ....................................................... H02S 50/10
USPC ............................................................. 702/60
See application file for complete search history.

(56) References Cited

U.S. PATENT DOCUMENTS

| 5,669,987 A * | 9/1997 | Takehara et al. ............... 136/244 |
| 6,892,165 B2 | 5/2005 | Yagi et al. |
| 2002/0059035 A1 | 5/2002 | Yagi et al. |

(Continued)

FOREIGN PATENT DOCUMENTS

| EP | 1403649 | 3/2004 |
| EP | 1628182 | 2/2005 |

(Continued)

OTHER PUBLICATIONS

International Search Report, Feb. 15, 2011.
(Continued)

*Primary Examiner* — Bryan Bui
(74) *Attorney, Agent, or Firm* — Greenblum & Bernstein, P.L.C.

(57) ABSTRACT

A diagnosis device (17) for a solar power generation system, which diagnosis device (17) diagnoses a whole or a part of an output in the solar power generation system includes: a measurement data acquiring section (21) for acquiring an electric current value and a voltage value from an ammeter (12a) and a voltmeter (12b), respectively; and an diagnosing section (25) diagnoses the output on the basis of a motion of a power point indicated by the electric current value and the voltage value thus acquired.

9 Claims, 11 Drawing Sheets

(56) References Cited

U.S. PATENT DOCUMENTS

2009/0000659 A1    1/2009   Hasegawa et al.
2011/0146746 A1*   6/2011   Chen et al. .................... 136/244

FOREIGN PATENT DOCUMENTS

| | | |
|---|---|---|
| JP | 08-122420 | 5/1996 |
| JP | 2001-326375 | 11/2001 |
| JP | 2003-324207 | 11/2003 |
| JP | 2007-311487 | 11/2007 |
| JP | 2008-300745 | 12/2008 |
| WO | 2009/140543 | 11/2009 |

OTHER PUBLICATIONS

Stellbogen D Ed, Institute of Electrical and Electronics Engineers et al., "Use of PV circuit simulation for fault detection in PV array fields", Proceedings of the Photovoltaic Specialists Conference, Louisville, May 10-14, 1993; New York, IEEE, US, vol. Conf. 23, May 10, XP010113215, pp. 1302-1307.

Search Report issued by E.P.O. patent office in E.P.O. Patent Application No. 11734605.6, dated Sep. 8, 2015.

* cited by examiner

FIG. 6

| MOTION INFO. | DIAGNOSIS INFO. |
|---|---|
| STATIONARY STATE | NORMAL STATE |
| MOVING | ABNORMAL STATE |
| BACK TO ORIGINAL STATE AFTER MOVING | TEMPORARY ABNORMAL STATE |
| STAY IN MOVED POSITION | PERMANENT ABNORMAL STATE |

PRIOR ART

EVALUATION METHOD FOR SOLAR POWER GENERATION SYSTEM, EVALUATION DEVICE, AND EVALUATION PROGRAM

TECHNICAL FIELD

The present invention relates to a method of diagnosing a whole or a part of an output of a solar power generation system, A diagnosis apparatus, and A diagnosis program.

BACKGROUND ART

There is no concern about running out of solar energy, in addition, the solar energy is environmentally-friendly clean energy. Accordingly, a solar power by use of the solar energy has been popular in recent years. Constituent members of a solar battery for use in a solar power generation system for generating a solar power will be described with reference to FIG. 11. FIG. 11 is a schematic diagram illustrating a relationship among an solar battery array 1010, a solar battery string 1001, solar battery modules 1011, and a solar battery cell 1000.

Note that, in the following description, the solar battery array, the solar battery string, the solar battery module, and the solar battery cell are abbreviated as the array, the string, the module, and the cell, respectively.

As illustrated in FIG. 11, the cell 1000 which receives radiation of sunlight to thereby generate an electric current with a photoelectric effect serves as a minimum unit of a solar battery. The module 1011 includes the plurality of cells 1000. The string 1001 is a string in which the plurality of modules 1011 are connected to each other in series. The array 1010 is an array in which the plurality of strings 1001 are connected to each other in parallel.

Next, an arrangement of a conventional solar power generation system will be schematically described with reference to FIG. 12. FIG. 12 is a block diagram illustrating a schematic configuration of the conventional solar power generation system 1100. As illustrated in FIG. 12, the solar power generation system 1100 includes an array 1010, a power conditioner 1020, and a load 1030. A direct-current power outputted from the array 1010 is inverted into an alternating-current power by an inverter 1021 included in the power conditioner 1020, and after that the alternating-current power is supplied to the load 1030.

Note that, as illustrated in FIG. 12, the solar power generation system 1100 is configured, for example, so as to operate in cooperation with a commercial electric power system 1040 provided by an electric power company, or alternatively, so as to operate as an independently system without cooperating with the electric power system 1040 of the electric power company.

An output of each of the cells 1000 is changed by various causes such as an installation state of the cells (e.g., angle of inclination), seasons (solar altitude), time (solar azimuth), weather (intensity of solar radiation (amount of solar radiation)), and/or temperatures. Therefore, even if an output of the solar power generation system is decreased, it is difficult to determine whether or not such decrease is caused by failure.

CITATION LIST

Patent Documents

Patent Document 1
Japanese Patent Application Publication, Tokukai, No. 2007-311487 A (Publication date: Nov. 29, 2007)

Patent Document 2
Japanese Patent Application Publication, Tokukai, No. 2001-326375 A (Publication date: Nov. 22, 2001)

SUMMARY OF INVENTION

Technical Problem

In order to solve the problem, a characteristic evaluation apparatus for a solar battery described in Patent Literature 1 measures an electric current-voltage characteristic of the module 1011, and converts the electric current-voltage characteristic thus measured into a predetermined reference state. Thus the characteristic evaluation apparatus determines which reference characteristic of a plurality of reference characteristics stored in a storage section approximates the electric current-voltage characteristic thus converted into the reference state. As the plurality of reference characteristics, some electric current-voltage characteristics corresponding to some typical failures are stored in the storage section, so that contents of failures can be estimated.

However, in order to measure the electric current-voltage characteristic of the module 1011, it is necessary to measure the electric current-voltage characteristic while changing a load against the module 1011. It is therefore necessary to stop a power conditioner of a solar power generation system once. This causes a loss of electric power generation. The loss of the electric power generation is further increased because the power conditioner takes time to restart. It is also necessary to measure individual modules 1011, and this takes time and effort.

Meanwhile, Patent Literature 2 discloses a diagnosis method for a solar power generation system. In the diagnosis method, installation conditions (a land form of installation place, a meteorological condition, a system configuration, etc.) of the solar power generation system is inputted, and a reference output characteristic obtained when the solar power generation system is normally operated is calculated in accordance with the installation condition thus inputted, meanwhile, an output characteristic of a solar power generation system actually operated is measured, and the reference output characteristic thus calculated and the output characteristic thus measured are compared with each other. Based on a result of this comparison, the solar power generation system determines that the output is normal or abnormal and, if the output is abnormal, the solar power generation system evaluates a cause of the abnormality.

In this case, a characteristic to be compared with is not an electric current-voltage characteristic but an output characteristic, and an object to be compared with the reference output characteristic is not the individual modules 1011 but a whole solar power generation system. Accordingly, there is no need to stop the solar power generation system to carry out diagnosis. This makes it possible to carry out diagnosis rapidly.

However, the output characteristic of Patent Literature 2 are a direct-current voltage, a direct current, a alternating-current voltage, an alternating current, an electric power, and an amount of electric power, and the comparison is carried out by determining whether or not the measurement value is within a range from a lower limit to an upper limit. The lower limit can be obtained by multiplying a predetermined reference value by a predetermined lower limit coefficient, and the upper limit can be obtained by multiplying the reference value by a predetermined upper limit coefficient. Accordingly, how to determine the reference value, the lower limit coefficient, and the upper limit coefficient may influence accuracy of the diagnosis.

The present invention has been made in view of the aforementioned problem, and one object of the present invention is to provide, for example, a diagnosis method for a solar power generation system, which diagnosis method can easily diagnose an output of a solar power generation system with accuracy.

Solution to Problem

A diagnosis method for a solar power generation system according to the present invention, the method diagnosing a whole or a part of an output in the solar power generation system, the method includes: an acquiring step for acquiring any two measurement values of an electric current value, a voltage value, and an electric power value of the output; and an diagnosing step for diagnosing the output on the basis of transition of a power point indicated by the two measurement values acquired in the acquiring step.

Further, in order to attain the aforementioned object, a diagnosis apparatus for a solar power generation system according to the present invention diagnosing a whole or a part of an output in the solar power generation system, the diagnosis apparatus includes: acquiring means for acquiring any two measurement values of an electric current value, a voltage value, and an electric power value of the output; and diagnosing means for diagnosing the output on the basis of transition of a power point indicated by the two measurement values acquired in the acquiring means.

The two measurement values which are necessary for the method and the arrangement can be measured from a whole or a part of the output of the solar power generation system. Therefore, there is no need to measure the two measurement values in a state in which the solar power generation system is stopped. This makes it possible to rapidly carry out diagnosis.

Generally, an output current of a solar battery cell is decreased when intensity of solar radiation is reduced, whereas the output current is slightly increased and an output voltage is remarkably decreased when a temperature is increased. Accordingly, if an maximum power point which is a power point obtained when the output is maximum changes in a direction which is different from an increase/decrease direction of an electric current value and an increase/decrease direction of a voltage value, the solar power generation system can diagnose that the output is changed by a cause other than the intensity of solar radiation and the temperature and therefore the output is abnormal. Further, the solar power generation system can diagnose that such change in output is only temporary abnormality caused by a shade etc. if the maximum power point returns to an original state, whereas, if the maximum power point does not return to the original state, the change in output is permanent abnormality caused by failure etc. As described above, the solar power generation system can diagnose a type of abnormality.

Further, under the same levels of environmental parameters (such as intensity of solar radiation and a temperature), output characteristics (such as an I (electric current)–V (voltage) characteristic and a P (electric power)–V characteristic) which are indicated by the two measurement values are different between a case where the output is normal and a case where the output is abnormal. It is therefore possible to diagnose that the output is abnormal if the power point indicated by the two measurement values is not within the range of the reference characteristic which is the output characteristic obtained when the output is normal. Further, the solar power generation system can diagnose that the change in output is only the temporary abnormality. if the maximum power point returns to the reference characteristic, whereas, if the maximum power point does not return to the reference characteristic, the change in output is the permanent abnormality. As described above, the solar power generation system can diagnose a type of abnormality.

As described above, unlike Patent Literature 2, the solar power generation system can diagnose an output on the basis of a motion of the power point. Therefore, there is no need to renew the reference value and the coefficients. This makes it possible to easily carry out diagnosis with accuracy.

In the diagnosis method according to the present invention, it is preferable that the acquiring step further acquires intensity of solar radiation; the diagnosis method further includes a normalizing step for normalizing the two measurement values by use of the intensity of solar radiation acquired in the acquiring step at a predetermined intensity of solar radiation; and the diagnosing step diagnoses the output on the basis of transition of the power point indicated by the two measurement values normalized in the normalizing step.

In this case, the transition of the power point is irrelevant to the intensity of solar radiation. Accordingly, the power point obtained when the output is normal is changed with respect to a temperature and an air mass, however, is substantially fixed with respect to the intensity of solar radiation. Therefore, the solar power generation system can diagnose that the output is abnormal if the maximum power point moves in a direction which is not the increase/decrease direction of the voltage value. Further, the reference characteristic becomes a characteristic which does not depend on the intensity of solar radiation. This makes it possible to carry out diagnosis more easily and also to improve accuracy of the diagnosis.

Incidentally, an air mass (AM) means a length of distance in which sunlight passes the atmosphere. Assuming that a length of a distance in which sunlight which has been incident in a direction vertical to the atmosphere passes the atmosphere is set to AM1.0, a length of the distance in which sunlight passes the atmosphere is represented by use of a ratio with respect to AM1.0.

In the diagnosis method according to the present invention, the acquiring step may further acquire a temperature; and the normalizing step may normalize the two measurement values at a predetermined intensity of solar radiation and a predetermined temperature by use of the intensity of solar radiation and the temperature acquired in the acquiring step.

In this case, the transition of the power point becomes irrelevant to intensity of solar radiation and a temperature. Accordingly, a power point obtained when the output is normal is changed with respect to the air mass, whereas the power point is substantially fixed with respect to the intensity of solar radiation and the temperature. Therefore the solar power generation system can diagnose that, if the maximum power point moves, the output is abnormal. Further, the reference characteristic becomes a characteristic which does not depend on intensity of solar radiation and a temperature. This makes it possible to carry out diagnosis more easily and also to improve accuracy of the diagnosis.

Note that it is desirable to use, as the intensity of solar radiation and the temperature, the intensity of solar radiation and the temperature in an installation place of the solar power generation system, however, the intensity of solar radiation and the temperature in the vicinity of the installation place may be used. Further, the intensity of solar radiation and the temperature may be acquired from a pyrheliometer and a thermometer, respectively, provided in the solar power generation system, or alternatively, may be acquired from a pyrheliometer and a thermometer, respectively, provided in an external apparatus. Note that, in a case of using a pyrheliometer and a thermometer provided far away from the installation place, it is desirable to appropriately correct values of intensity of solar radiation and a temperature measured by the pyrheliometer and the thermometer, so as to use the pyrheliometer and the thermometer as if they are located at the installation place.

In the diagnosis method according to the present invention, the diagnosing step may diagnose the output by comparing the power point with one or a plurality of reference values obtained when the output is normal. Note that the reference point may be a series of reference points, i.e., a line.

In the diagnosis method according to the present invention, it is preferable that the acquiring step further acquires an environmental parameter of the output, the diagnosing step diagnoses the output by comparing, under a same level of the environmental parameter, the power point with the one or the plurality of reference values obtained when the output is normal. Here, the environmental parameter means a natural condition which may influence a function of the system. Examples of the environmental parameters in the solar power generation system mainly encompass intensity of solar radiation and a temperature, and also an air mass. In a case where the aforementioned method is used, the reference point and the power point can be compared with each other without depending on the environmental parameter. This improves accuracy of diagnosis of the output.

The method is carried out, for example, in such a manner that (i) the two measurement values are normalized to predetermined intensity of solar radiation by use of the intensity of solar radiation thus acquired, and (ii) the power point indicated by the two measurement values thus normalized and the one or the plurality of reference points are compared with each other. Further, another example of the method is carried out in such a manner that the reference point under predetermined intensity of solar radiation is converted into the reference point under the intensity of solar radiation thus acquired, and the reference point thus converted and the power point indicated by the two measured values thus acquired are compared with each other. Furthermore, still another example of the method is carried out in such a manner that the reference point under predetermined intensity of solar radiation is converted into reference points under various kinds of intensity of solar radiation, and the reference points thus converted are stored in the storage section so as to be associated with the respective kinds of intensity of solar radiation, and then a reference point corresponding to the intensity of solar radiation thus acquired and the power point indicated by the two measurement values thus acquired are compared with each other.

In the diagnosis method according to the present invention, the diagnosing step may include a storing step for storing time series data of the power point in a storage section, a specifying step for specifying a pattern of the transition of the power point by use of the time series data, and an abnormality type specifying step for specifying a type of abnormality corresponding to the pattern of the transition. In this case, the type of abnormality can be diagnosed accurately.

In the diagnosis method according to the present invention, it is preferable that the diagnosing step further includes: an extracting step for extracting the pattern of the transition of the power point from the time series data of the power point; an abnormality type acquiring step for acquiring the type of abnormality via an input device; and an associating step for associating the type of abnormality acquired in the abnormality type acquiring step and the pattern of the transition of the power point extracted in the extracting step with each other. It is therefore possible to improve the associating of the type of abnormality and the pattern of the transition of the power point. This further improves accuracy of diagnosis.

It is possible that a diagnosis program causes a computer to carry out the steps of the diagnosis method for a solar power generation system. Further, the diagnosis program is stored in a computer readable recording medium, so that any computer can carry out the diagnosis program.

Advantageous Effects of Invention

As described above, in a diagnosis method for a solar power generation system according to the present invention, two necessary measurement values can be measured from a whole or a part of an output of a solar power generation system. Accordingly, there is no need to measure the two measurement values while stopping the solar power generation system. This makes it possible to rapidly carry out diagnosis. Further, it is possible to diagnose the output on the basis of a motion of the power point, so that the solar power generation system can easily diagnose the output of the solar power generation system with accuracy.

BRIEF DESCRIPTION OF DRAWINGS

FIG. 6 is a table illustrating an example of a motion diagnosis associating table stored in the diagnosis device.

DESCRIPTION OF EMBODIMENTS

[Embodiment 1]

Figure 1:
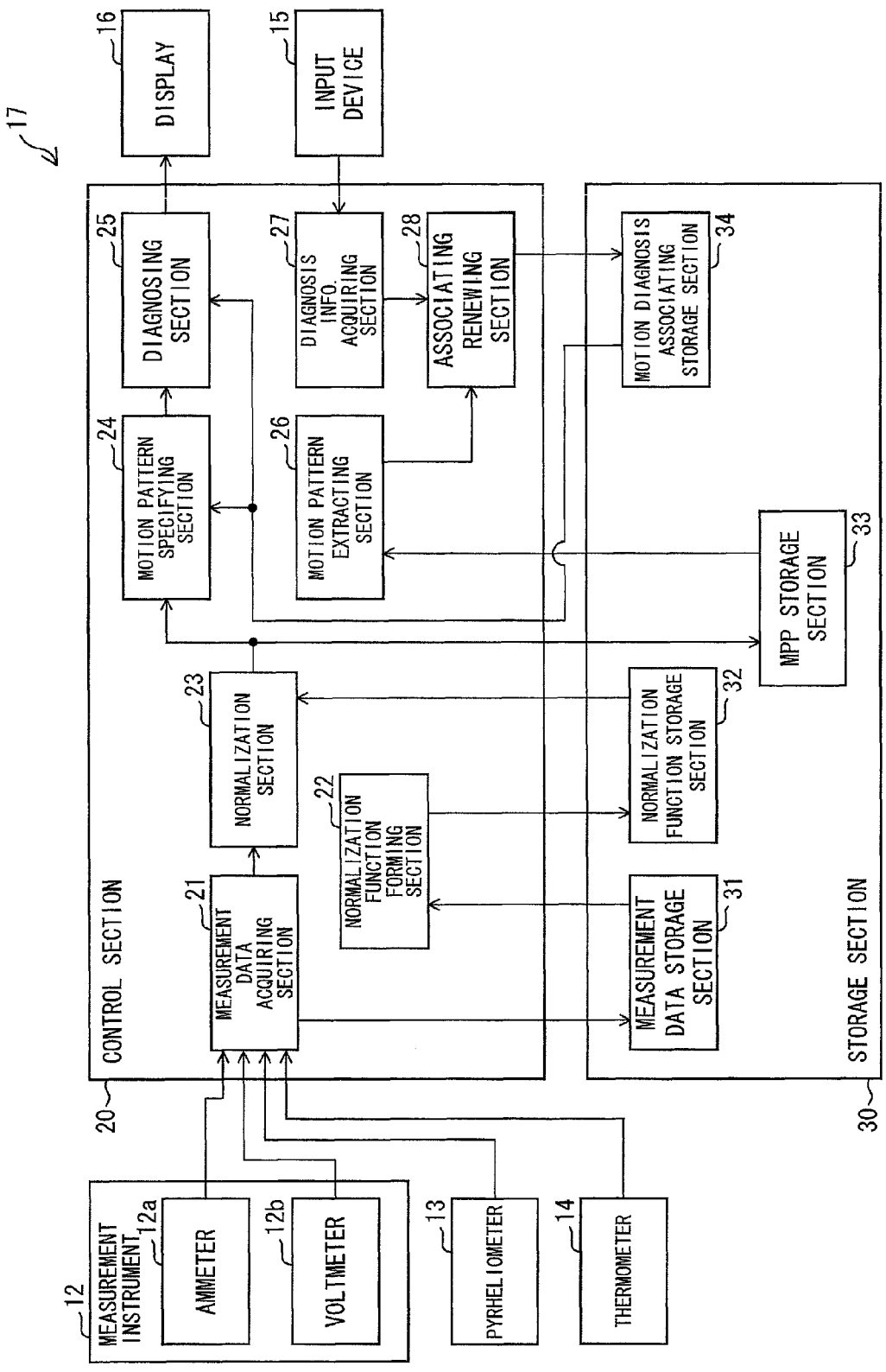
FIG. 1 is a functional block diagram illustrating a schematic configuration of a diagnosis device in a solar power generation system according to an embodiment of the present invention.
Figure 2:
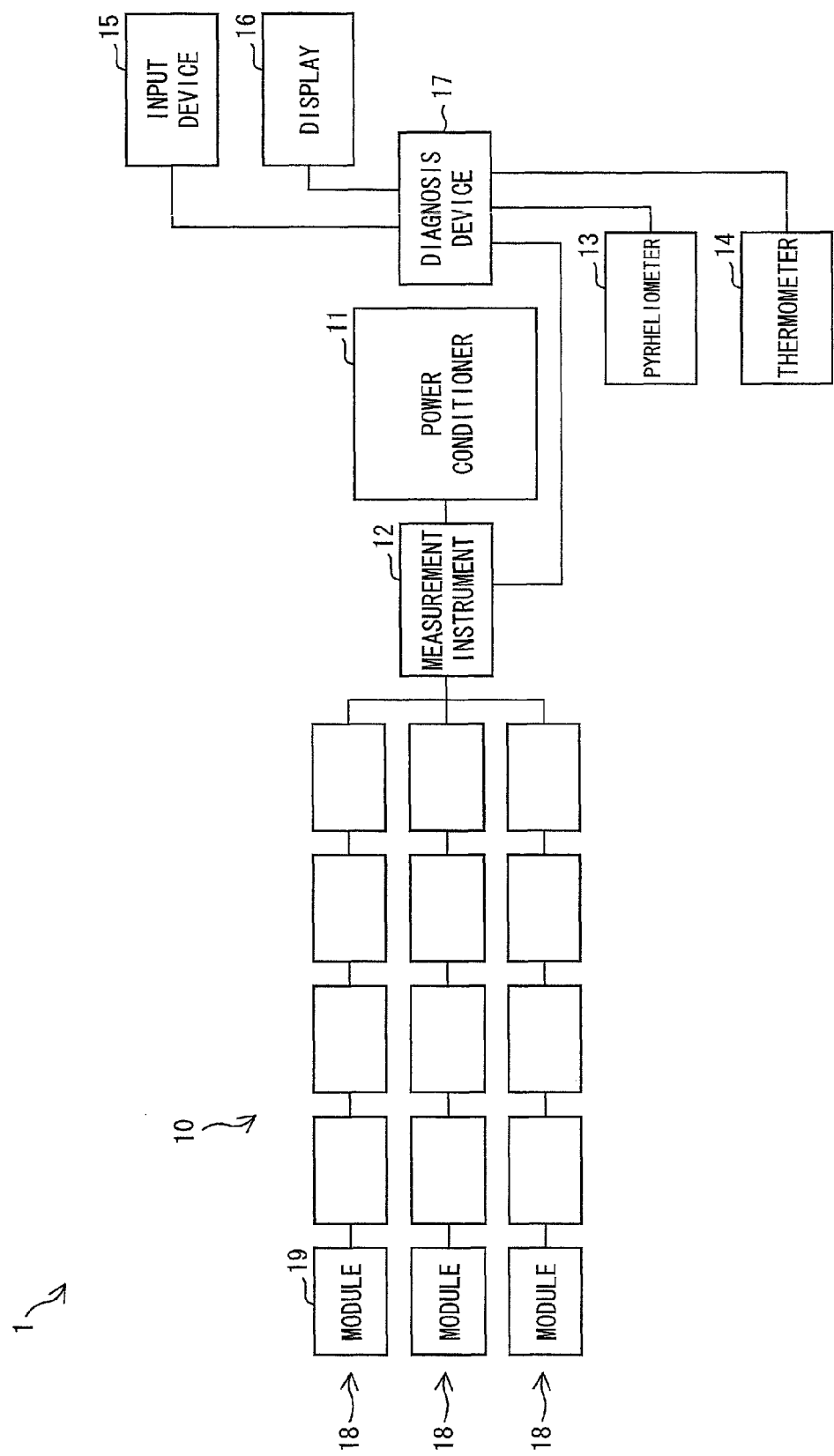
FIG. 2 is a functional block diagram illustrating a schematic configuration of the solar power generation system.

An embodiment of the present invention will be described with reference to FIG. 1 to FIG. 9. FIG. 2 is a functional block diagram illustrating a schematic configuration of a solar power generation system 1 according to this embodiment. As illustrated in FIG. 2, the solar power generation system 1 includes an array 10, a power conditioner 11, a measurement instrument 12, a pyrheliometer 13, a thermometer 14, an input device 15, a display 16, and a diagnosis device (diagnosis apparatus) 17.

Note that the array 10 is not limited to the configuration of FIG. 2, and can be configured variously.

The power conditioner 11 adjusts an electric power transmitted from the array 10 so as to cause the electric power to be suppliable to a load (not illustrated). The measurement instrument 12 measures an electric current value and a voltage value supplied from the array 10 to the power conditioner 11, and includes an ammeter 12a and a voltmeter 12b (FIG. 1). The measurement instrument 12 transmits the electric current value and the voltage value thus measured to the diagnosis device 17.

The pyrheliometer 13 measures intensity of solar radiation (amount of solar radiation) of the array 10. The intensity of solar radiation means an amount of radiant energy from the sun per unit time and unit area. The pyrheliometer 13 transmits the intensity of solar radiation thus measured to the diagnosis device 17. The thermometer 14 measures a temperature of the array 10. The thermometer 14 transmits the temperature thus measured to the diagnosis device 17.

Note that each of the measurement instrument 12, the pyrheliometer 13, and the thermometer 14 may periodically transmit measured physical quantity(quantities), or may transmit the measured physical quantity(quantities) in accordance with a request from the diagnosis device 17. Further, each of the measurement instrument 12, the pyrheliometer 13, and the thermometer 14 may transmit not only the measured physical quantity(quantities) but also a measured time to the diagnosis device 17. Instead of the intensity of solar radiation, an amount of solar radiation expressed by hours of sunshine×intensity of solar radiation may be used.

The input device 15 is configured to receive a command input, an information input, etc. from a user, and is constituted by, for example, a key input device (such as a keyboard and a button) or a pointing device (such as a mouse). The input device 15 receives information and transmits the information thus received to the diagnosis device 17.

The display 16 displays various kinds of information. The display 16 is constituted by a display such as an LCD (liquid crystal display) element, a CRT (cathode ray tube), a plasma display, or the like.

The diagnosis device 17 diagnoses that an output of the array 10 is normal or abnormal by use of the values measured by the measurement instrument 12, the pyrheliometer 13, and the thermometer 14. If a result of this diagnosis is abnormal, the diagnosis device 17 diagnoses a cause of this abnormality. In this embodiment, in a case of the abnormality, the diagnosis device 17 diagnoses that the abnormality is temporary (e.g., the abnormality caused by weather or a shadow) or permanent (e.g., the abnormality caused by failure). The diagnosis device 17 causes the display 16 to display a result of the diagnosis.

Figure 3:
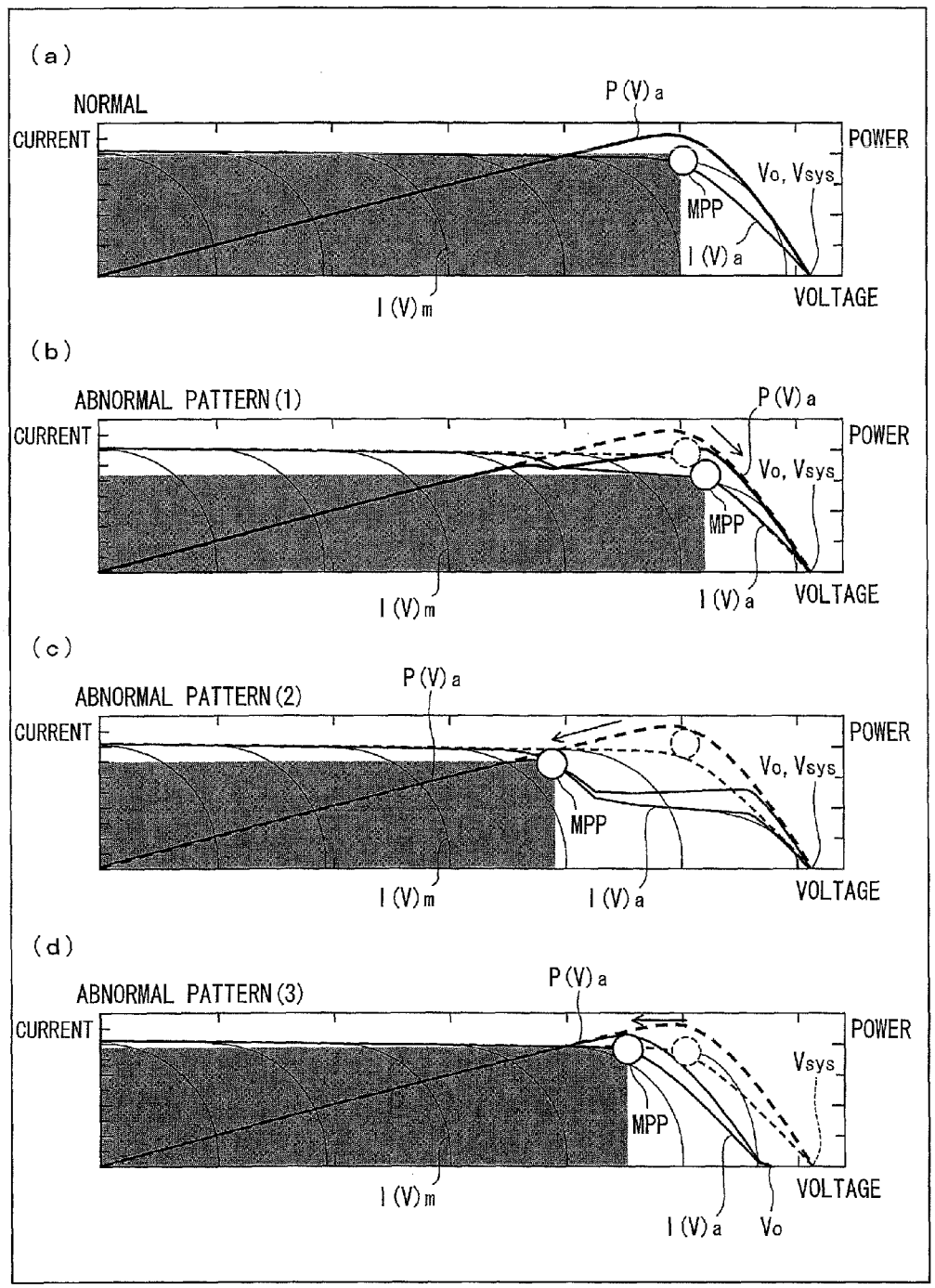
FIG. 3 is graphs illustrating an output characteristic of an array in the solar power generation system under the same environmental parameters.
Figure 4:
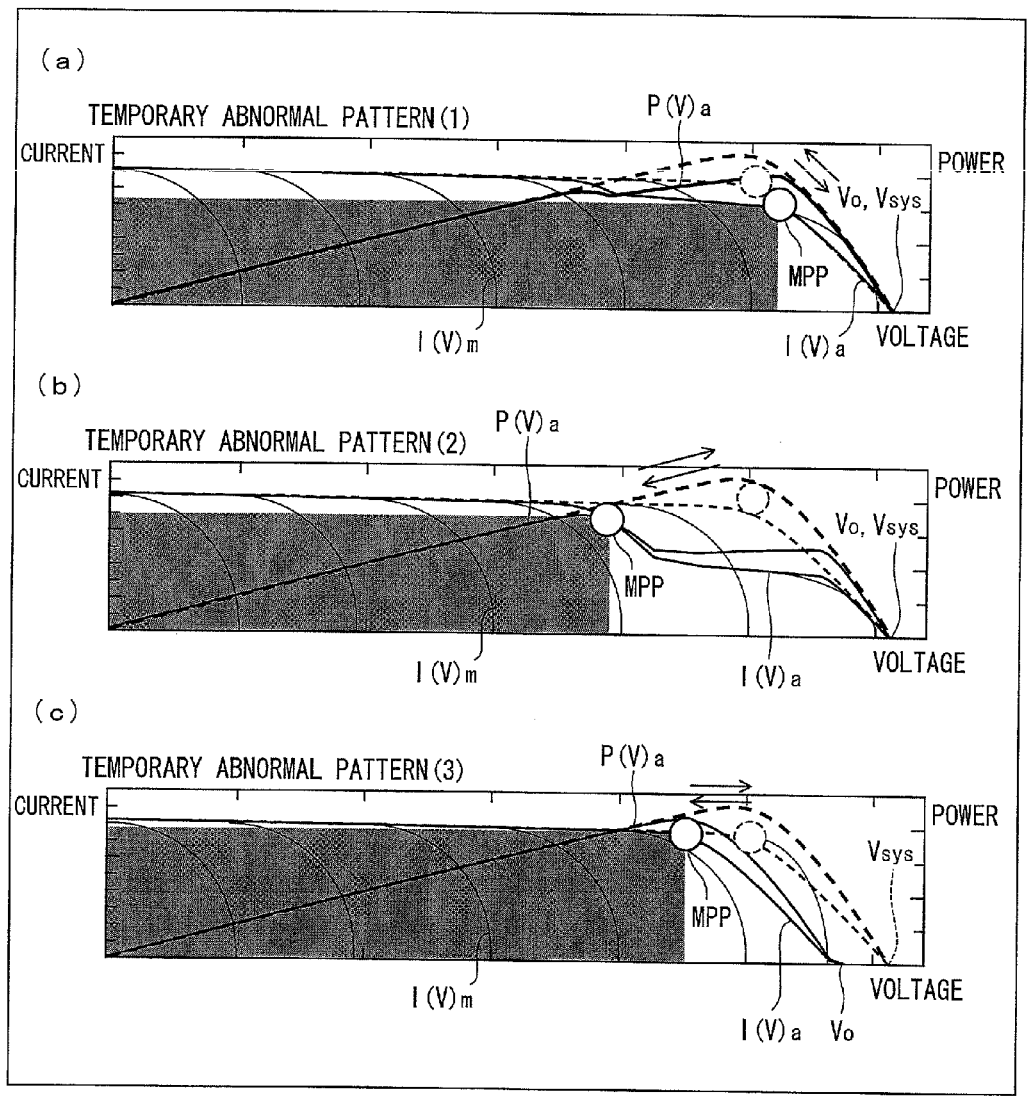
FIG. 4 is graphs illustrating output characteristics in a case where an output of the array is temporarily abnormal.
Figure 5:
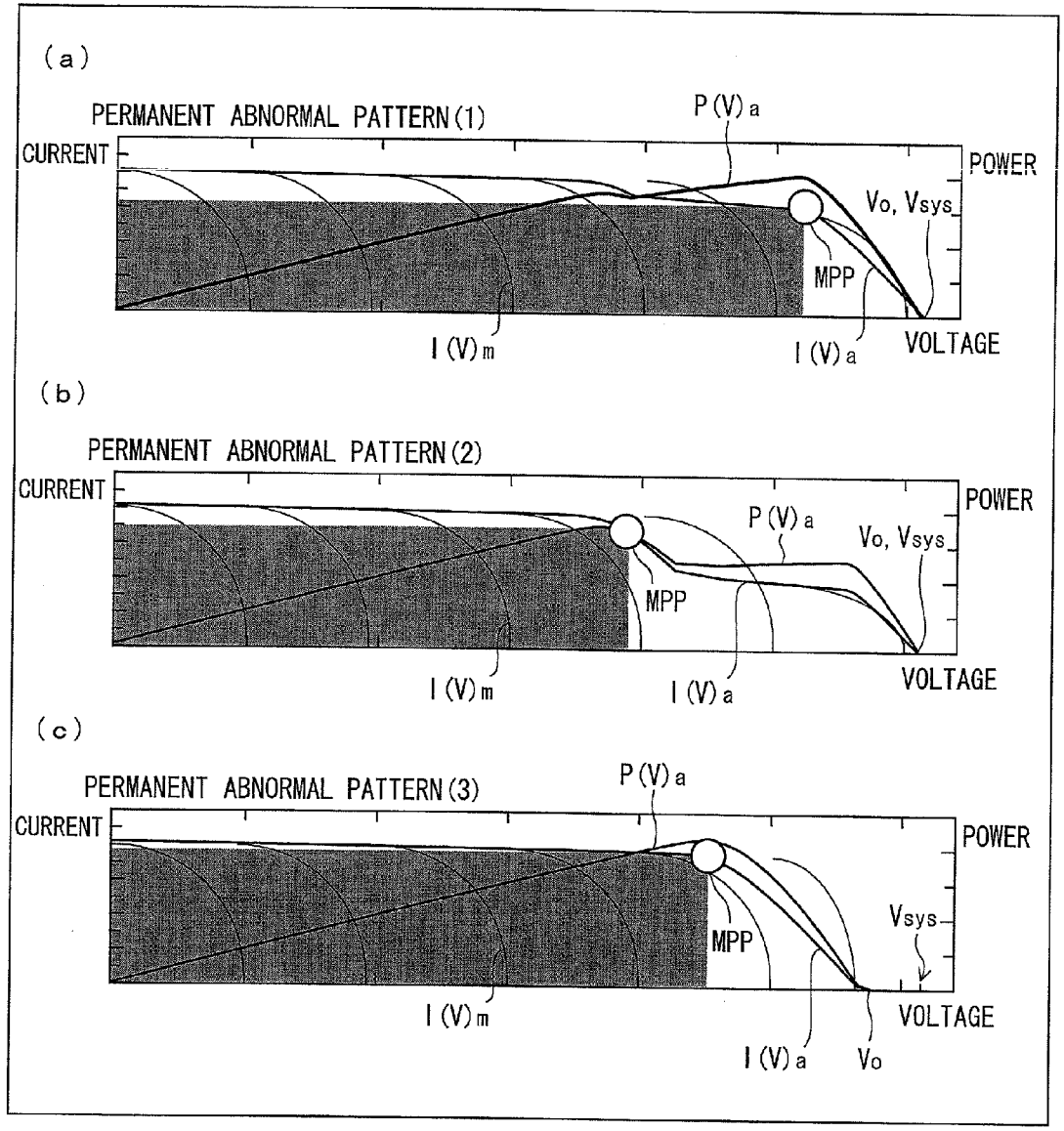
FIG. 5 is graphs illustrating output characteristics in a case where an output of the array is permanently abnormal.

The following description will discuss a specific diagnosis method for the diagnosis device 17 with reference to FIG. 3 to FIG. 5. Each of FIGS. 3 to 5 are graphs illustrating output characteristics of the array 10 under the same environmental parameters (intensity of solar radiation and temperature).

In the graphs of FIGS. 3 to 5, the abscissa axis denotes a voltage, and the ordinate axis denotes an electric current and an electric power. Further, a thin line in each of the graphs denotes an I-V characteristic I(V)m of one module 19, and a middle thickness line in each of the graphs denotes an I-V characteristic I(V)a of the array 10. As illustrated in FIGS. 3 to 5, the I-V characteristic I(V)a of the array 10 is what the I-V characteristics I(V)m of the respective plurality of modules 19 are added.

Further, a thick line in each of the graphs denotes a P-V characteristic P(V)a of the array 10. Accordingly, a position of coordinate indicated by a voltage value and an electric current value which generate a maximum electric power value can be calculated from the P-V characteristic P(V)a and the I-V characteristic I(V)a of the array 10. This is a maximum power point (MPP). The solar power generation system 1 is designed to operate at the MPP. A region indicated by gray is an area indicating an electric power at the maximum power point, and is expressed as an area calculated from voltage× electric current.

(a) of FIG. 3 illustrates an output characteristic in a case where an output of the array 10 is normal, and (b) to (d) of FIG. 3 each illustrate an output characteristic in a case where an output of the array 10 is abnormal. Note that the output characteristic ((a) of FIG. 3) obtained when the output of the array 10 is normal is illustrated by a broken line in each of (b) to (d) of FIG. 3.

It is found that, when (a) and (b) to (d) of FIG. 3 are compared with each other, the MPP obtained when the output of the array 10 is normal is different from the MPPs obtained when the outputs of the array 10 are abnormal. Accordingly, the solar power generation system 1 can determine that the output of the array 10 is abnormal in a case where the solar power generation system 1 operates at a point which is different from the MPP in the normal state.

Further, when (a) and (b) to (d) of FIG. 3 are compared with each other, it is found that an output characteristic obtained when the output of the array 10 is normal is different from output characteristics obtained when outputs of the array 10 are abnormal. Specifically, as illustrated in (a) of FIG. 3, the I-V characteristic I(V)a obtained when the output of the array 10 is normal is flat from a point where a voltage is zero to the MPP, then linearly decreases, and as a result, an open circuit voltage Vo obtained when an electric current is zero becomes equal to an open circuit voltage Vsys of the solar power generation system 1.

Meanwhile, in a case where the output of the array 10 is abnormal, the I-V characteristic I(V)a becomes uneven as illustrated in (b) and (c) of FIG. 3, or the open circuit voltage Vo becomes lower than the open circuit voltage Vsys of the solar power generation system 1 as illustrated in (d) of FIG. 3. Accordingly, the solar power generation system 1 can determine that the output of the array 10 is abnormal if the I-V characteristic I(V)a becomes uneven or the open circuit voltage Vo becomes lower than the open circuit voltage Vsys of the solar power generation system 1.

Further, (a) to (c) of FIG. 4 each illustrate an output characteristic in a case where an output of the array 10 is temporarily abnormal, and (a) to (c) of FIG. 5 each illustrate an output characteristic in a case where an output of the array 10 is permanently abnormal. Note that, in FIG. 4, the output characteristic obtained when the output of the array 10 is normal ((a) of FIG. 3) is illustrated by a broken line.

As illustrated in FIG. 4, the MPP in the temporarily abnormal state has timewise and/or seasonal changes. Meanwhile, as illustrated in FIG. 5, an MPP in the permanently abnormal state does not have such timewise and seasonal changes. Accordingly, if the output of the array 10 is abnormal, the solar power generation system 1 can determine that the output is temporarily abnormal or permanently abnormal by checking whether or not the MPP has timewise or seasonal changes.

Further, as illustrated in FIG. 4, the I-V characteristic I(V)a in the temporarily abnormal state has timewise and seasonal changes from the graph of the solid line to the graph of the broken line or from the graph of the broken line to the graph of the solid line. On the contrary, as illustrated in FIG. 5, the I-V characteristic I(V)a in the permanently abnormal state remains the graph of the solid line, i.e., does not have the timewise and seasonal changes. Accordingly, if the output of the array 10 is abnormal, the solar power generation system 1 can determine that the output of the array 10 is the temporary abnormality or the permanent abnormality on the basis of whether or not the I-V characteristic I(V)a has the timewise and seasonal changes.

Note that, in this embodiment, a reference characteristic is set to be the output characteristic obtained when the output of the array 10 is normal. However, the reference characteristic may be set to be an output characteristic obtained when an output of another array which has a configuration same as that of the array 10 is normal. Further, the reference characteristic may be calculated from a factory-setting output characteristic of the module (solar panel) 19. Further, the reference characteristic may be set to be an output characteristic obtained by correcting the output characteristic by use of various correction coefficients owned by a manufacturer. The correction coefficients depend on an amount of the solar radiation, a module temperature, and/or the like.

Note that the output is gradually decreased by age-related deterioration, and finally become zero when the array 10 is broken. Accordingly, the solar power generation system 1 can determine that abnormality is caused by age-related deterioration if the power point is gradually decreased from the reference characteristic over a long time. The solar power generation system 1 can also predict failure caused by age-related deterioration on the basis of how much the power point is decreased.

Next, the diagnosis device 17 will be described in detail with reference to FIG. 1. Note that, in this embodiment, the diagnosis device 17 is operated in a state in which an output of the array 10 is maximum. FIG. 1 is a functional block diagram illustrating a schematic configuration of the diagnosis device 17. As illustrated in FIG. 1, the diagnosis device 17 includes a control section 20 and a storage section 30.

The control section 20 collectively control operations of various configurations in the diagnosis device 17, and the storage section 30 stores information. As illustrated in FIG. 1, the control section 20 includes a measurement data acquiring section (acquiring means) 21, a normalization function forming section 22, a normalization section 23, a motion pattern specifying section 24, a diagnosing section (diagnosing means) 25, a motion pattern extracting section 26, a diagnosis information acquiring section 27, and an associating renewing section 28. Further, the storage section 30 includes a measurement data storage section 31, a normalization function storage section 32, an MPP storage section 33, and a motion diagnosis associating storage section 34.

The measurement data storage section 31 stores, as measurement data, time series data of an electric current value, a voltage value, intensity of solar radiation, and a temperature measured by the ammeter 12a and the voltmeter 12b of the measurement instrument 12, the pyrheliometer 13, and the thermometer 14, respectively. Note that the measurement data includes measurement time for each measurement value or each predetermined time period.

The normalization function storage section 32 stores a normalization function for normalizing a first measurement value which depends on a second measurement value to a value obtained when the second measurement value is assumed to be a predetermined value. Specifically, the normalization function storage section 32 stores (A) an electric current normalization function for normalizing an electric current value which depends on intensity of solar radiation to an electric current value under a predetermined intensity of solar radiation and (B) a voltage normalization function for normalizing a voltage value which depends on a temperature to a voltage value at a predetermined temperature.

The MPP storage section 33 stores time series data of the maximum power point (MPP). The maximum power point is a point whose coordinate components are the electric current value and the voltage value thus normalized in a case where an output of the measurement instrument 12 (an output of the array 10) is maximum.

The motion diagnosis associating storage section 34 stores a motion diagnosis associating table in which motion information indicating a motion of the MPP (change over time) and diagnosis information of an output of the array 10 be associated with each other. FIG. 6 is a table illustrating an example of the motion diagnosis associating table. Note that a reference point obtained when an output of the array 10 is normal may be set in advance, and "STATIONARY STATE" corresponded to "NORMAL STATE" may be changed to "STOP AT REFERENCE POINT".

The measurement data acquiring section 21 acquires time series data of an electric current value, a voltage value, intensity of solar radiation, and a temperature measured by the ammeter 12a and the voltmeter 12b of the measurement instrument 12, the pyrheliometer 13, and the thermometer 14, respectively. The measurement data acquiring section 21 transmits the measurement data thus acquired to the normalization section 23 and causes the measurement data storage section 31 to store the measurement data.

The normalization function forming section 22 forms the normalization function by use of the measurement data read out from the measurement data storage section 31. The normalization function forming section 22 causes the normalization function storage section 32 to store the normalization function thus formed.

Figure 7:
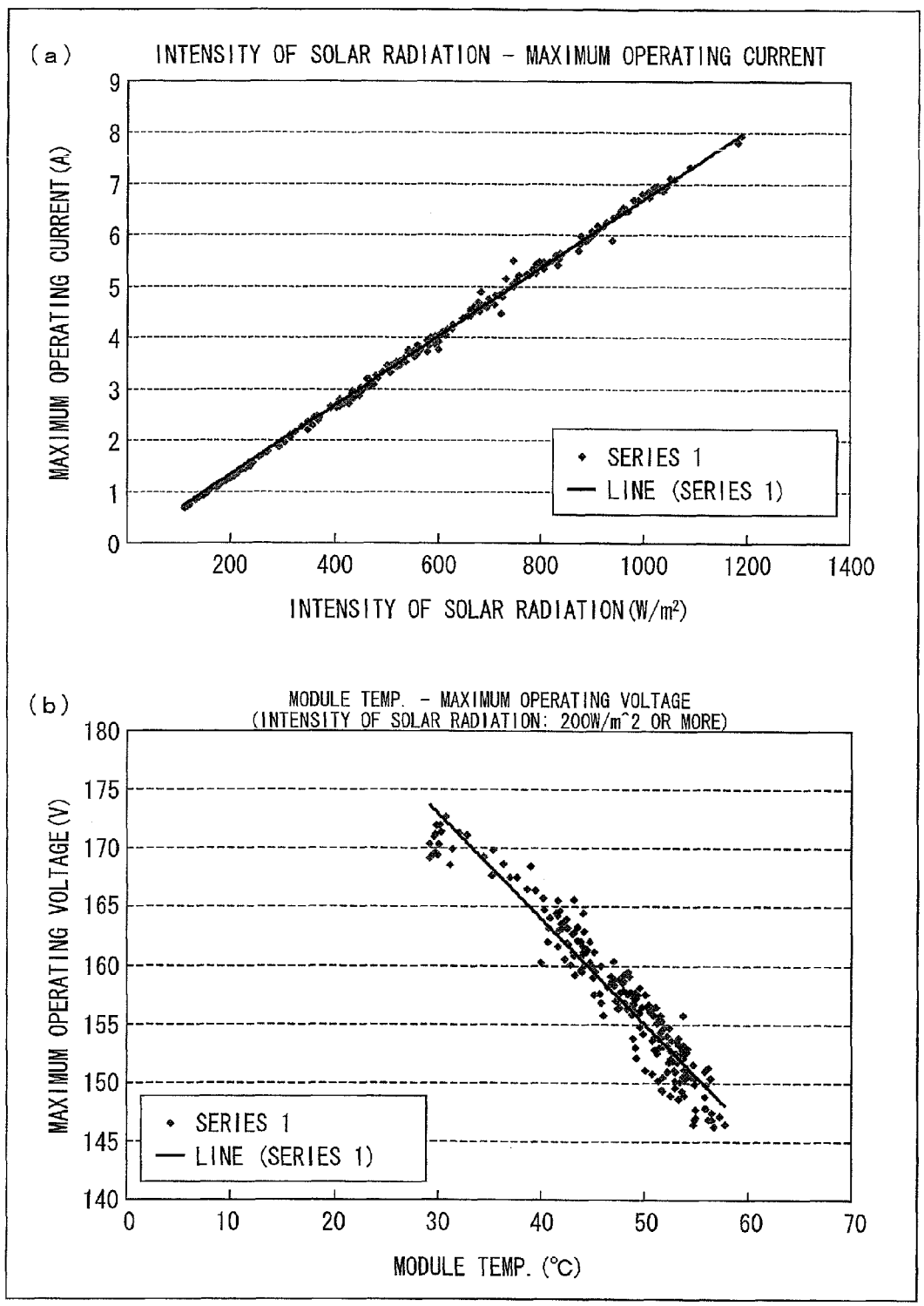
FIG. 7 is graphs illustrating a relationship among an electric current value, intensity of solar radiation, a voltage value, and a temperature in the solar power generation system.

The following description will discuss a method in which the normalization function forming section 22 forms the normalization function with reference to FIG. 7. In (a) and (b) of FIG. 7 are graphs indicating an electric current normalization function and a voltage normalization function, respectively, of this embodiment.

As illustrated in (a) of FIG. 7, the normalization function forming section 22 carries out a regression analysis with respect to the time series data of the electric current value (maximum operating current) and the intensity of solar radiation which are read out from the measurement data storage section 31, and calculates a regression equation. As illustrated in (a) of FIG. 7, the regression equation is "electric current value=0.0097×intensity of solar radiation". By using the regression equation, an electric current normalization function which converts an electric current value which depends on intensity of solar radiation into, for example, an electric current value whose intensity of solar radiation is 1000 W/m$^2$ is formed. That is, the electric current normalization function is (normalized electric current value)=electric current value× 1000/intensity of solar radiation.

Further, the normalization function forming section 22 carries out a regression analysis with respect to the time series data of a measurement data voltage value (maximum operating voltage) and a temperature (module temperature) read out from the storage section 31, and calculates the regression equation. Note that an accurate regression analysis cannot be carried out with low intensity of solar radiation, so that the time series data whose intensity of solar radiation is larger than a predetermined value (200 W/m$^2$ in FIG. 7) is used. As illustrated in (b) of FIG. 7, the regression equation is voltage value=−0.8977×temperature+199.87. By using this regression equation, a voltage normalization function which converts a voltage value which depends on a temperature into a voltage value obtained at a temperature of 25° C. is formed. That is, the voltage normalization function is (normalized voltage value)=−0.8977×(25−temperature)+voltage value.

The normalization section 23 normalizes an electric current value and a voltage value by use of the electric current normalization function and the voltage normalization function, respectively, stored in the normalization function storage section 32, on the basis of the measurement data of the measurement data acquiring section 21. The normalization section 23 transmits the time series data of the electric current value and the voltage value thus normalized to the motion pattern specifying section 24 and causes the MPP storage section 33 to store the time series data.

When the electric current value is normalized by the intensity of solar radiation, transition of the normalized power point becomes irrelevant to the intensity of solar radiation, so that a power point obtained when an output to the array 10 is normal is fixed with respect to the intensity of solar radiation. Accordingly, if the MPP moves in a direction different from a direction of increase/decrease in voltage value, it is possible to diagnose that the output is abnormal. Further, the reference characteristic becomes a characteristic which does not depend on the intensity of solar radiation. This makes it further easier to carry out such diagnosis, and accuracy of the diagnosis is improved.

Further, when the voltage value is normalized by the temperature, the transition of the normalized power point becomes irrelevant to the intensity of solar radiation and the temperature, so that a power point obtained when an output of the array 10 is normal is fixed. Accordingly, if the MPP moves, it is possible to diagnose that the output is abnormal. Further, the reference characteristic becomes a characteristic which does not depend on the intensity of solar radiation and the temperature. This makes it further easier to carry out such diagnosis, and accuracy of the diagnosis is improved.

However, in contradiction to the normalization, the reference characteristic may be converted on the basis of the intensity of solar radiation and the temperature acquired by the measurement data acquiring section 21. Alternatively, a reference characteristic may be obtained as follows: a reference characteristic is converted on the basis of various kinds of intensity of solar radiation and various temperatures in advance; reference characteristics thus converted are stored in the storage section 30 so as to be associated with the various kinds of intensity of solar radiation and the various temperatures; and one reference characteristic corresponding to certain intensity of solar radiation and a certain temperature acquired by the measurement data acquiring section 21 is read out from the storage section 30.

Note that a configuration relating to the normalization, specifically, the normalization function forming section 22, the normalization section 23, and the normalization function storage section 32 may be provided in the measurement instrument 12. In this case, the pyrheliometer 13 and the thermometer 14 can transmit intensity of solar radiation and a temperature, respectively, to the measurement instrument 12.

The motion pattern specifying section 24 specifies a motion pattern of an MPP whose coordinate component is the electric current value and the voltage value thus normalized in the normalization section 23. The motion pattern specifying section 24 transmits the motion pattern thus specified to the diagnosing section 25. Specifically, the motion pattern specifying section 24 specifies which motion pattern of the MPP is suitable for the motion information included in the motion diagnosis associating table of the motion diagnosis associating storage section 34, and transmits the motion information thus specified to the diagnosing section 25. Note that the time series data of the electric current value and the voltage value thus normalized may be also acquired from the MPP storage section 33 by the motion pattern specifying section 24.

The diagnosing section 25 diagnoses an output of the array 10 on the basis of the motion pattern of the MPP transmitted from the motion pattern specifying section 24. The diagnosing section 25 causes the display 16 to display a result of the diagnosis. Specifically, the diagnosing section 25 searches for diagnosis information corresponding to the motion information of the MPP transmitted from the motion pattern specifying section 24 from the motion diagnosis associating table of the motion diagnosis associating storage section 34, and then causes the display 16 to display the diagnosis information thus searched for.

The motion pattern extracting section 26 extracts a motion pattern of an MPP from the time series data of the electric current value and the voltage value thus normalized in the MPP storage section 33. The motion pattern extracting section 26 transmits the motion pattern thus extracted to the associating renewing section 28.

The diagnosis information acquiring section 27 acquires diagnosis information from a user via the input device 15. The diagnosis information acquiring section 27 transmits the diagnosis information thus acquired to the associating renewing section 28. Note that the diagnosis information may be directly inputted via a keyboard from a user, or alternatively, a user may select diagnosis information, via the input device 15, from various kinds of diagnosis information displayed to the display 16.

The associating renewing section 28 renews the motion diagnosis associating table of the motion diagnosis associating storage section 34 by causing the motion pattern of the motion pattern extracting section 26 and the diagnosis information of the diagnosis information acquiring section 27 to be associated with each other. Thus the motion diagnosis associating table is enhanced. This makes it possible to improve accuracy of the diagnosis.

Figure 8:
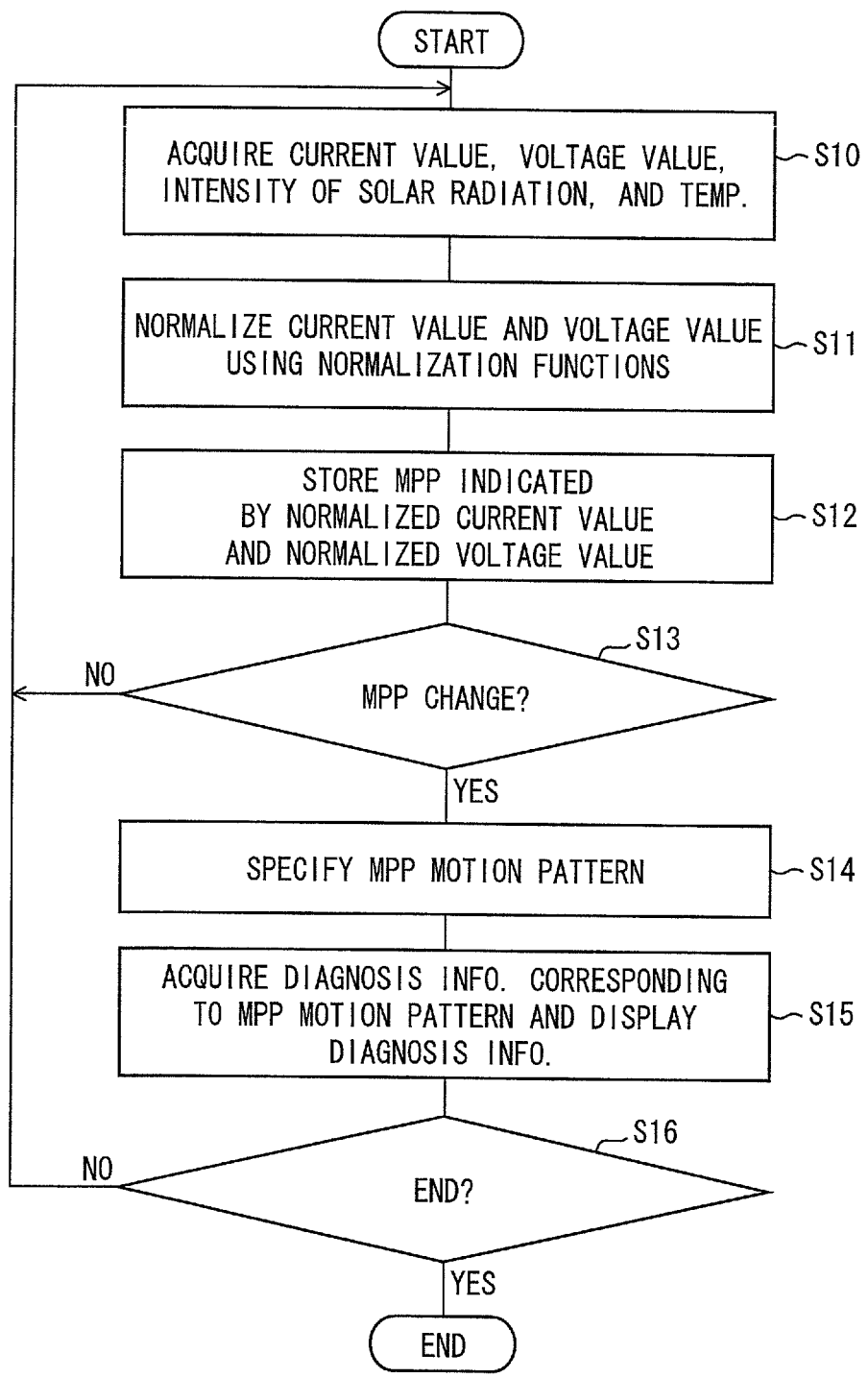
FIG. 8 is a flowchart illustrating how diagnosis processing is performed in a control section of the solar power generation system.

Next, an processing operation in the control section 20 of the diagnosis device 17 having the configuration will be described by use of FIGS. 8 and 9. FIG. 8 illustrates how diagnosis processing is performed in the control section 20.

As illustrated in FIG. 8, first, the measurement data acquiring section 21 acquires an electric current value, a voltage value, intensity of solar radiation, and a temperature, from the ammeter 12a, the voltmeter 12b, the pyrheliometer 13, and the thermometer 14, respectively (S10, acquiring step). Next, the normalization section 23 normalizes the electric current value and the voltage value thus acquired by use of the intensity of solar radiation and the temperature thus acquired and an electric current normalization function and a voltage normalization function stored in the normalization function storage section 32 (S11, normalizing step). Then an MPP indicated by the electric current value and the voltage value thus normalized is stored in the MPP storage section 33 (S12, diagnosing step, storing step).

Next, the motion pattern specifying section 24 determines whether or not the MPP is changed (S13, diagnosing step). If the MPP is not changed, the motion pattern specifying section 24 determines that the output of the array 10 is normal. Then the processing returns to Step 10 and the aforementioned operation is repeated. Meanwhile, if the MPP is changed, the motion pattern specifying section 24 specifies which motion information included in the motion diagnosis associating table of the motion diagnosis associating storage section 34 a motion pattern of the MPP is associated with (S14, diagnosing step, pattern specifying step). The diagnosing section 25 acquires diagnosis information corresponding to the motion pattern of the MPP thus specified from the motion diagnosis associating table of the motion diagnosis associating storage section 34, and causes the display 16 to display the pattern (S15, diagnosing step, abnormality type specifying step). After that, the aforementioned operation is repeated unless the control section 20 receives a command for ending the diagnosis processing (S16).

Figure 9:
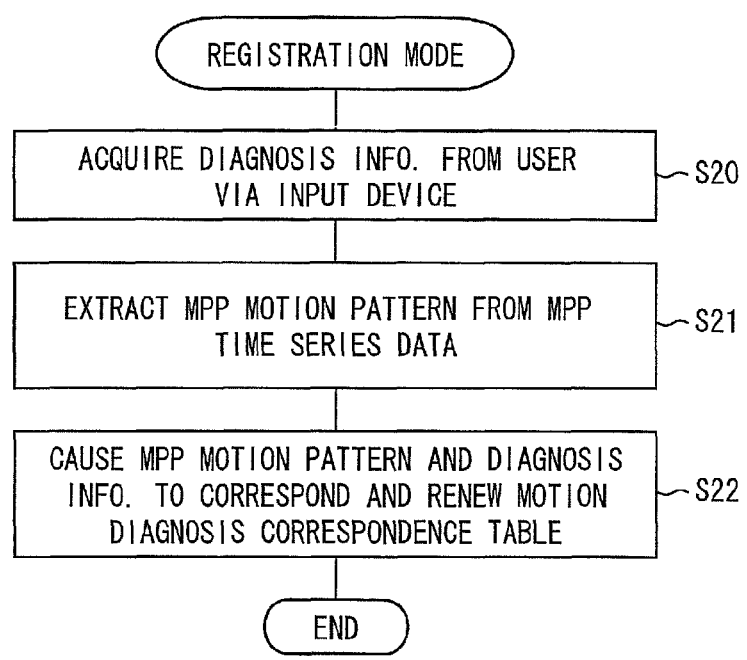
FIG. 9 is a flowchart illustrating how to perform a registration mode in the control section, in which mode a new motion pattern and new diagnosis information are registered.

FIG. 9 illustrates how to perform a registration mode in the control section 20, in which mode a new motion pattern and new diagnosis information are registered. As illustrated in FIG. 9, first, the diagnosis information acquiring section 27 acquires diagnosis information from a user via the input device 15 (S20, diagnosing step, abnormality type acquiring step). Next, the motion pattern extracting section 26 extracts a motion pattern of the MPP from the time series data (electric current value and voltage value) of the normalized MPP transmitted from the MPP storage section 33 (S21, diagnosing step, extracting step). Then, the associating renewing section 28 causes the motion pattern and the diagnosis information to correspond to each other, and renews the motion diagnosis associating table of the motion diagnosis associating storage section 34 (S22, diagnosing step, associating step). Thereafter, this processing operation is ended.

As described above, the solar power generation system of this embodiment needs any two of the measurement values, specifically, an electric current value, a voltage value, and an electric power, and the two measurement values can be measured on the basis of the output of the array 10. It is therefore unnecessary to measure the two measurement values in a state in which the solar power generation system 1 is stopped. This makes it possible to carry out the diagnosis quickly. Further, the output can be diagnosed on the basis of the motion of the MPP. It is therefore unnecessary to renew any reference value and any coefficient, unlike Patent Literature 2. This makes it possible to easily carry out the diagnosis of the output with accuracy.

Note that the diagnosis is carried out by use of an electric current value and a voltage value in this embodiment. However, the inventions of the present application can be implemented even in a case where one of the electric current value and the voltage value is replaced with an electric power value. Alternatively, it is possible to omit the pyrheliometer 13 and the thermometer 14. In this case, intensity of solar radiation and a temperature can be acquired from an external apparatus (e.g., website of the Meteorological Agency). Note that, in a case of using intensity of solar radiation and a temperature acquired from a pyrheliometer and a thermometer, respectively, which are installed far away from an installation place of the solar power generation system 1, it is desirable to appropriately correct the values of the intensity of solar radiation and the temperature to those of intensity of solar radiation and a temperature of a pyrheliometer and a thermometer, respectively, installed in the installation place.

Further, one measurement instrument 12 is provided in each array 10 in this embodiment, however, it is possible to provide one measurement instrument 12 in each string 18. In this case, it is possible to diagnose whether or not an output for each string 18 is normal. If the output is abnormal, a cause of this abnormality can be diagnosed.

Further, an output characteristic for each string 18 can be measured. This makes it possible to measure a whole output characteristic, without losing electric power generation of a whole array, by shifting a timing for measuring the output characteristic for each string 18.

Further, it is possible to provide the measurement instrument 12 in each module 19. In this case, it is possible to diagnose whether or not the output for each module 19 is normal. If the output is abnormal, a cause of this abnormality can be diagnosed.

Figure 10:
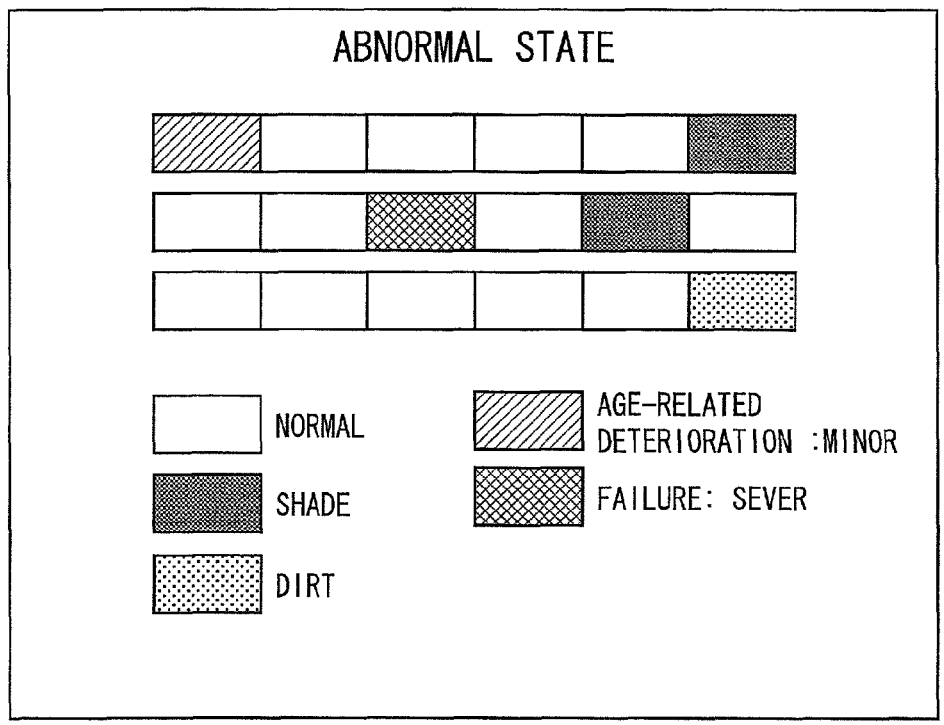
FIG. 10 is a view illustrating an example of an image which (A) shows an abnormal situation in units of module of the array and (B) is displayed on a display of the solar power generation system.
Figure 11:
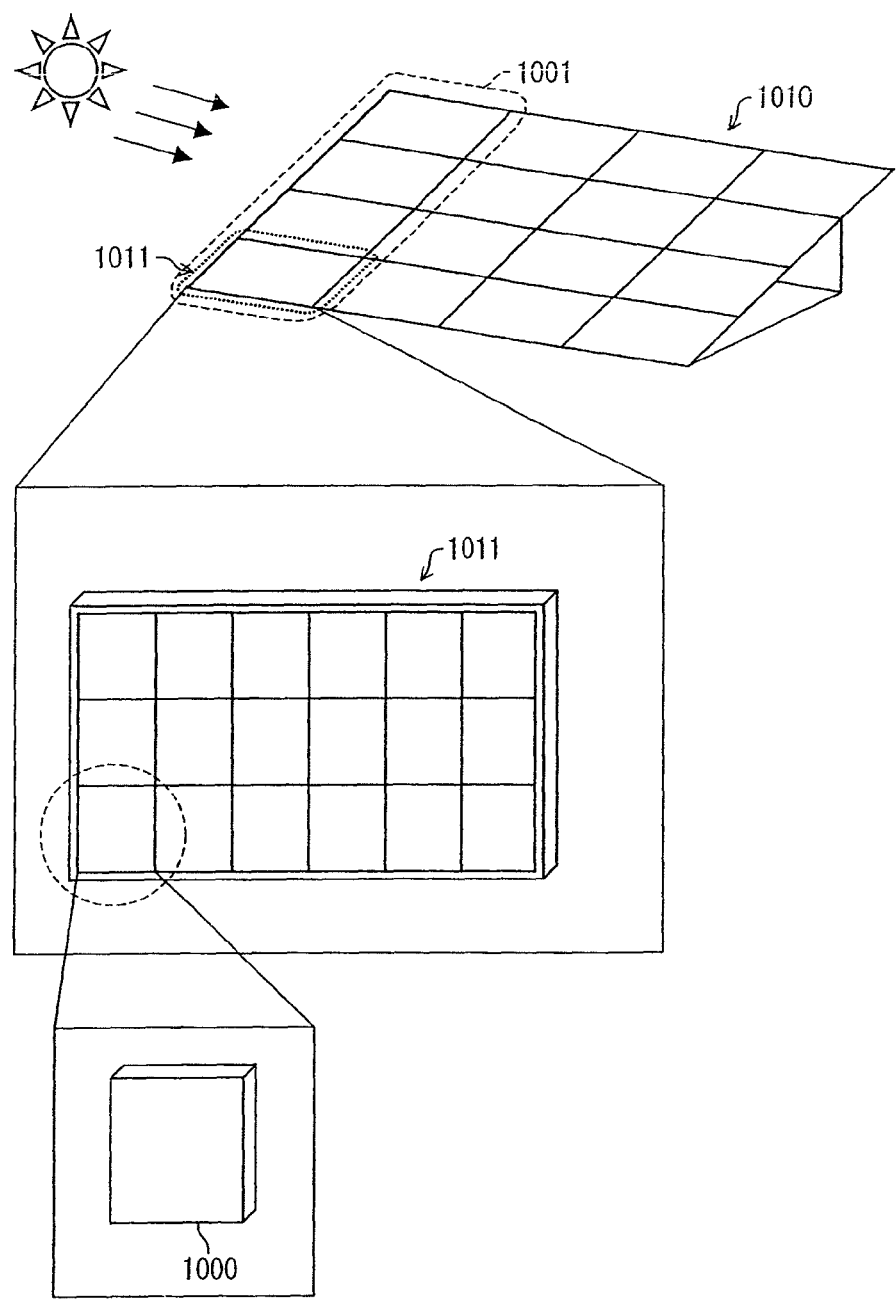
FIG. 11 is a schematic diagram illustrating a relationship among an array, a string, a module, and a cell in a solar power generation system.
Figure 12:
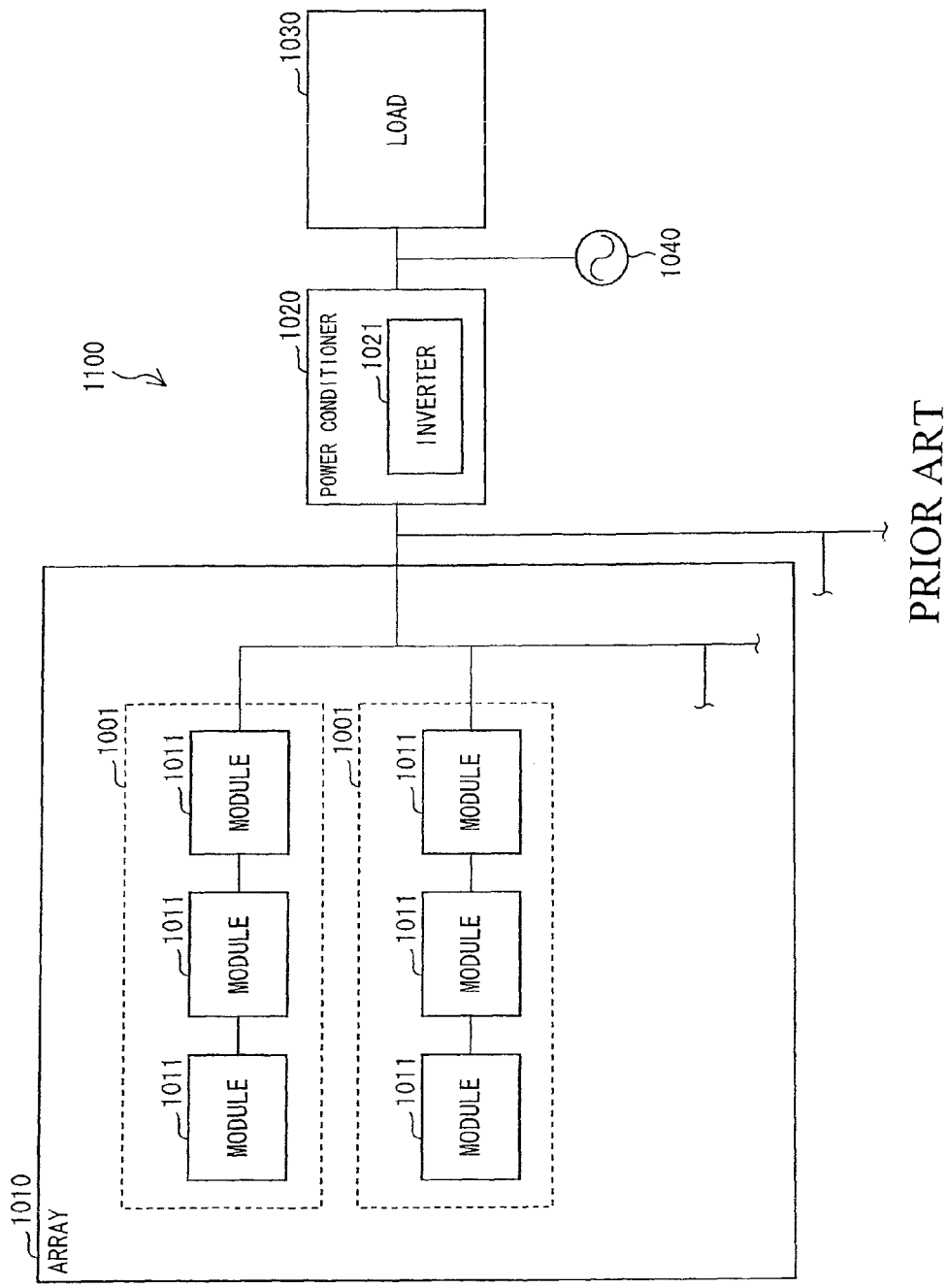
FIG. 12 is a block diagram illustrating a schematic configuration of a conventional solar power generation system.

FIG. 10 is an example of an image which (A) is displayed on the display 16 and (B) shows an abnormal situation which indicates whether or not an output for each module 19 is abnormal. Note that, in example of FIG. 10, a difference between colors is represented by a dot, hatching, or the like. As illustrated in FIG. 10, different colors are allotted depending on the type of abnormality. This makes it possible for user to easily understand an abnormal situation in the solar power generation system.

Further, the measurement instrument 12 can be provided in each solar battery cluster constituting the modules 19, or alternatively, can be provided in each cell constituting the solar battery cluster. It is therefore possible to diagnose whether or not an output in each unit is normal. If the output is abnormal, a cause of the abnormality can be diagnosed.

Further, the pyrheliometer 13, the thermometer 14, the input device 15, the display 16, and the diagnosis device 17 are provided for one array 10 in this embodiment, however, can be also provided for a plurality of arrays 10. This makes it possible to reduce the number of the pyrheliometers 13, the thermometers 14, the input devices 15, the displays 16, and the diagnosis devices 17.

Further, in a case where one array 10 and an adjacent array 10 have the same configuration in the same environment, it is possible to diagnose whether or not an output of the array 10 is normal by comparing measurement data of the array 10 and that of the adjacent array 10 with each other. If the output is abnormal, a cause of this abnormality can be diagnosed. In this case, the pyrheliometer 13 and the thermometer 14 are unnecessary.

A plurality of diagnosis devices 17 and a diagnosis server connected via a communication network may be further added to this embodiment. The diagnosis server may receive an MPP and a motion diagnosis associating table from the plurality of diagnosis devices 17, and then may store the MPP and the motion diagnosis associating table. In this case, there is a possibility to find a new correlation between a motion of the MPP and a cause of abnormality on the basis of a large amount of data. In addition, the new correlation is transmitted to the diagnosis devices 17, so that the diagnosis devices 17 can carry out more specific diagnosis. Note that the present invention may be configured so that the plurality of diagnosis devices 17 are connected to each other via the communication network, instead of providing the diagnosis server.

The present invention is not limited to the description of the embodiments above, and can be modified in numerous ways by a skilled person as long as such modification falls within the scope of the claims. An embodiment derived from a proper combination of technical means disclosed in different embodiments is also encompassed in the technical scope of the present invention.

For example, the input device 15, the display 16, and the diagnosis device 17 are provided separately from the power conditioner 11 and the measurement instrument 12 in this embodiment, however, can be provided inside the power conditioner 11 or the measurement instrument 12.

Finally, each block of the diagnosis device 17, specifically, the control section 20 may be configured by a hardware logic, or may be realized by software by use of a CPU.

Specifically, the diagnosis device 17 includes a CPU (central processing unit) which carries out a command of a control program for realizing functions, a ROM (read only memory) which stores the program, a RAM (random access memory) which develops the program, and a storage apparatus (recording medium), such as a memory, which stores the program and various kinds of data. Further, the object of the present invention can be also realized in such a manner that: a recording medium is provided to the diagnosis device 17, which recording medium has stored program codes (execution mode program, intermediate code program, and source program) (serving as software for realizing the aforementioned functions) of a control program in the diagnosis device 17 so as to be readable by a computer; and the program codes stored in the recording medium are read out and carried out by the computer (or CPU or MPU).

Examples of the recording medium encompass: tapes such as a magnetic tape and a cassette tape; disks such as magnetic disks (e.g., a floppy (registered trademark) disk and a hard disk) and optical disks (e.g., a CD-ROM, an MO, an MD, a DVD, and a CD-R); cards such as an IC card (including a memory card) and an optical card; and semiconductor memories (e.g., a mask ROM, an EPROM, an EEPROM, and a flash ROM).

Further, the diagnosis device 17 may be configured to be connect to a communication network, and the program code may be supplied via the communication network. The communication network is not particularly limited, and examples of the communication network encompass the Internet, an intranet, an extranet, a LAN, an ISDN, a VAN, a CATV communication network, a virtual private network, a telephone network, a mobile communication network, and a satellite communication network. In addition, a transmission medium constituting the communication network is not particularly limited, and examples of the transmission medium encompass: wired transmission media such as IEEE1394, a USB, a power-line carrier, a cable TV line, a telephone line, and an ADSL; and wireless transmission media such as infrared rays (e.g., IrDA and a remote controller), Bluetooth (registered trademark), 802.11 wireless, an HDR, a cell-phone network, and a satellite line, and a digital terrestrial network. Note that the present invention may be also realized by a computer data signal which has the program codes specified with electronic transmission and is embedded in a carrier wave.

INDUSTRIAL APPLICABILITY

The present invention can be suitably and widely used for a solar power generation system no matter what size the solar power generation system is.

REFERENCE SIGNS LIST 1 solar power generation system
10 array
11 power conditioner
12 measurement instrument
12a ammeter
12b voltmeter
13 pyrheliometer
14 thermometer
15 input device
16 display
17 diagnosis device (diagnosis apparatus)
18 string
19 module
20 control section
21 measurement data acquiring section (acquiring means)
22 normalization function forming section
23 normalizing section
24 motion pattern specifying section
25 diagnosing section (diagnosing means)
26 motion pattern extracting section
27 diagnosis information acquiring section
28 associating renewing section
30 storage section
31 measurement data storage section
32 normalization function storage section
33 MPP storage section
34 motion diagnosis associating storage section

The invention claimed is:

1. A diagnosis method for a solar power generation system, the method diagnosing a whole or a part of an output in the solar power generation system, the method comprising:
acquiring any two measurement values of an electric current value, a voltage value, and an electric power value of the output; and
diagnosing the output on the basis of transition of a power point defined by a position on a graph having two coordinate components specified by the acquired any two measurement values, the transition of the power point occurring on the graph,
the diagnosing including sub-processes of:
storing time series data of the power point in a storage;
specifying a pattern of the transition of the power point by use of time series data; and
diagnosing the output on the basis of the pattern of the transition.

2. The diagnosis method as set forth in claim 1, wherein:
in the acquisition of the any two measurement values an intensity of solar radiation is further acquired;
the diagnosis method further includes normalizing the two measurement values at a predetermined intensity of solar radiation by use of the acquired intensity of solar radiation; and
diagnosing the output on the basis of transition of the power point indicated by the normalized two measurement values.

3. The diagnosis method as set forth in claim 2, wherein:
in the acquisition of the any two measurement values a temperature is further acquired; and
the normalized two measurement values being normalized at a predetermined intensity of solar radiation and a predetermined temperature by use of the acquired intensity of solar radiation and the acquired temperature.

4. The diagnosis method as set forth in claim 1, wherein the output is diagnosed by comparing the power point with one or a plurality of reference values obtained when the output is normal, the reference values being positions on the graph.

5. The diagnosis method as set forth in claim 4, wherein:
in the acquisition of the any two measurement values an environmental parameter of the power point is further acquired, and
the output is diagnosed by comparing, under a same level of the environmental parameter, the power point with one or a plurality of reference values obtained when the output is normal.

6. The diagnosis method as set forth in claim 1, wherein the diagnosing include:
specifying a type of abnormality corresponding to the pattern of the transition.

7. The diagnosis method as set forth in claim 6, wherein the diagnosing include:
- extracting the pattern of the transition of the power point from the time series data of the power point;
- acquiring the type of abnormality via an input device; and
- associating the acquired type of abnormality and the extracted pattern of the transition of the power point to each other.

8. A diagnosis apparatus for a solar power generation system, the diagnosis apparatus diagnosing a whole or a part of an output in the solar power generation system, the diagnosis apparatus comprising:
- an acquirer that acquires any two measurement values of an electric current value, a voltage value, and an electric power value of the output; and
- a diagnoser that diagnoses the output on the basis of transition of a power point defined by a position on the graph and has, as two coordinate components, the acquired two measurement values, the transition of the power point occurring on the graph; and
- a storage that stores time series data of the power point,
- the diagnoser specifying a pattern of the transition of the power point by use of the time series data, and diagnosing the output on the basis of the pattern of the transition.

9. A non-transitory computer readable storage medium storing a diagnosis program for a solar power generation system, the diagnosis program being a program for operating a diagnosis apparatus which diagnoses a whole or a part of an output in the solar power generation system,
- wherein the diagnosis program causes a computer to carry out an acquisition of any two measurement values of an electric current value, a voltage value, and an electric power value of the output, and a diagnosing of the output on the basis of transition of a power point defined by a position on the graph and has, as two coordinate components, the acquired two measurement values, the transition of the power point occurring on the graph,
- the diagnosing including the sub processes of storing time series data of the power point in a storage section, specifying a pattern of the transition of the power point by use of the time series data, and diagnosing the output on the basis of the patter of the pattern of the transition.

* * * * *